United States Patent
Charlet et al.

(10) Patent No.: US 6,973,168 B2
(45) Date of Patent: Dec. 6, 2005

(54) METHOD OF IDENTIFYING A CALLER WITH A TELEPHONE SERVICE OPERATOR

(75) Inventors: Delphine Charlet, Lannion (FR); Thibaut Feuillet, Caen (FR); Jean-Luc Grimault, Mondeville (FR); Thierry Morel, Tourville sur Odon (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/344,312

(22) PCT Filed: Jul. 25, 2001

(86) PCT No.: PCT/FR01/02431

§ 371 (c)(1),
(2), (4) Date: Jul. 24, 2003

(87) PCT Pub. No.: WO02/13498

PCT Pub. Date: Feb. 14, 2002

(65) Prior Publication Data

US 2004/0022374 A1 Feb. 5, 2004

(30) Foreign Application Priority Data

Aug. 9, 2000 (FR) .................................. 00 10494

(51) Int. Cl.[7] ....................... H04M 1/64; H04M 15/00; G01L 11/00
(52) U.S. Cl. ................ 379/88.02; 704/251; 704/270.1; 704/273; 379/114.2
(58) Field of Search .......................... 379/88.01–88.05, 379/114.2, 114.15; 704/4, 251, 252, 263, 704/270.1, 257, 273, 246

(56) References Cited

U.S. PATENT DOCUMENTS

| 5,479,494 | A | 12/1995 | Clitherow | |
|---|---|---|---|---|
| 5,517,558 | A | 5/1996 | Schalk | |
| 5,737,701 | A | 4/1998 | Silverman | |
| 6,173,261 | B1 * | 1/2001 | Arai et al. | 704/257 |
| 6,389,397 | B1 * | 5/2002 | Otto | 704/270 |

FOREIGN PATENT DOCUMENTS

| DE | 44 43 226 | 6/1995 |
|---|---|---|
| EP | 0 756 410 | 1/1997 |
| WO | WO 97 16915 | 5/1997 |

* cited by examiner

Primary Examiner—Rexford Barnie
(74) Attorney, Agent, or Firm—Cohen, Pontani, Lieberman & Pavane

(57) ABSTRACT

A method of identifying a caller with a telephone service operator. Of the invention, said method comprises the following steps: for the operator, drawing up a list of literal expressions and allocating the caller an identifier consisting of a combination of consecutive literal expressions taken from each of said lists, for the caller, connecting to said telephone service and speaking, in order, each literal expression of said combination, and for the operator, identifying the caller by using voice recognition to search for the combination of literal expressions allocated to the caller. Application to secure access to telephone services.

9 Claims, 4 Drawing Sheets

US 6,973,168 B2

METHOD OF IDENTIFYING A CALLER WITH A TELEPHONE SERVICE OPERATOR

This is a U.S. National Phase Application under 35 USC 371 of International application No. PCT/FR01/02431, filed on 25 Jul. 2001.

FIELD OF THE INVENTION

The present invention relates to a method of identifying a caller with a telephone service company. It also relates to a prepaid telephone card for implementing the method.

The invention finds a particularly advantageous application in the field of secure access to telephone services.

BACKGROUND OF THE INVENTION

In the remainder of this description, the expression "identification of a caller" refers either to identifying the caller as such or to identifying a telephone account of the caller to which the amount due for telephone calls is debited, whether the account be a prepaid account or a deferred debit account.

At present, for telephone services that necessitate identification of the caller, the latter enters in DTMF code a number of digits that varies depending on the type of service and on the telephone service company. The number of digits to be entered is generally from 10 to 20. However, in the case of a call made with an electronic microchip telephone card from a public telephone fitted with a card reader, the number of digits to be entered is reduced to the four digits of a personal identification number, because the number of the card is stored in the microchip and is recovered by the telephone and transmitted to the telephone service company over the network.

The ergonomics of that prior art method are somewhat limited because the caller must memorize a series of digits, which can be very long, and so a first improvement has been introduced that consists in re-using the caller's fixed or mobile telephone number, to which a personal identification number can be added.

That solution is particularly suitable for services accessed from the caller's main telephone installation, whose number is transmitted automatically by the network.

In the case of mobile services, that solution removes the difficulty of memorizing identification numbers, as a caller generally knows his own telephone number, but does not avoid the need to enter digits in DTMF code.

Prepaid cards also employ that solution, by means of the facility for associating a prepaid card with a given telephone line, usually the one that the user employs most often to make calls using the card.

The above-described identification method is satisfactory in the case of access to telephone services from a fixed or a mobile terminal, in which case the identifier of the caller consists of the telephone number associated with the terminal, possibly with the addition of a personal identification number.

Nevertheless, in a mobile situation, the ergonomics remain somewhat irksome as the caller must still make a long and even painstaking (to avoid miskeying, etc.) entry in DTMF code, not forgetting that the user also has to remember his personal identification number.

Finally, for some services security is limited as the caller's telephone number is often known to third parties, so that a fraudster needs only to discover the personal identification number, if there is one.

A caller must still enter the entire number if using his prepaid telephone card at a telephone that is not associated with the card, as when making a call from a public telephone or away from home.

This phase is particularly difficult for prepaid cards, since for security reasons the number cannot be personalized. As a series of more than ten digits is generally very difficult to remember, the user must keep the card on his person at all times and take it out each time a call is made, in order to enter its number.

SUMMARY OF THE INVENTION

One object of the invention is to provide a way of identifying a caller with a telephone service company by a method that has improved ergonomics compared to the prior art method, in particular with regard to memorizing the identifier, while enhancing security.

This and other objects are attained in accordance with one aspect of the present invention directed to a method that comprises the following steps:
  for the telephone service company, drawing up a list of literal expressions and allocating to the caller an identifier consisting of a combination of consecutive literal expressions taken from each of said lists,
  for the caller, connecting to said telephone service and speaking, in order, each literal expression of said combination, and
  for the telephone service company, identifying the caller by searching a database for the identity of the caller allocated the combination of literal expressions spoken by the caller and recognized by the company.

The identification method of the invention is therefore based on voice recognition, for which existing technologies, in particular flexible multi-speaker voice recognition, are already able to recognize a spoken literal expression from among several thousand, the only condition being that it must be known which list contains the literal expression to be recognized. Generally speaking, a literal expression comprises a single word or a meaningful set of words, such as "Everything is OK".

In the case of a non-personalized service, such as a prepaid telephone card, an identifier (e.g., a combination of literal expressions) is provided on the card.

Compared to spoken or DTMF code entry of a multidigit identifier, the advantages of an identification method of the invention using voice recognition of a combination of literal expressions are:
  it is faster, a few seconds being sufficient to speak a series of literal expressions, and
  it is easier to remember, provided that the literal expressions are carefully chosen, of course, thereby enabling the caller to use the service without having his identifier on his person.

An identification method of the invention can be made secure in two ways.

A first way is to increase the number of potential combinations of literal expressions and allocate a limited number of such combinations as identifiers. If all possible combinations of literal expressions are known, the security ratio is the ratio of the number of possible combinations to the number of identifiers actually allocated. The hypothesis that all potential identifiers are known is much less probable with literal expressions than with digits, as the vocabulary is richer than the number of digits, which is limited to 10. Of course, the number of possible combinations can be further increased by increasing the number of lists of literal expressions used to formulate the identifier.

In a second security mode conforming to the invention, an authentication key is associated with the identifier and the caller provides the authentication key after speaking the combination of literal expressions allocated to him.

There are several variants of the authentication key associated with the identifier.

In a first variant, the authentication key is a number of digits to be entered in DTMF code.

In a second variant, the authentication key is another literal expression recorded by the caller the first time he connects to the telephone service.

In a third variant, the authentication key is a voiceprint of the caller established on speaking the combination of literal expressions.

Finally, associating a double authentication key with the identifier can be envisaged, comprising a main key consisting of a voiceprint and a back-up key consisting of a plurality of digits to be entered in DTMF code. This advantageous feature remedies situations in which the voiceprint of the caller cannot be recognized (for example because the caller is hoarse). In this case, the telephone service company, having determined that it is impossible to recognize the main key, requires the caller to provide his back-up key.

In a particular implementation callers may be provided with the facility to deactivate the authentication key, which reduces security but improves ergonomics.

BRIEF DESCRIPTION OF THE DRAWINGS

The following description with reference to the accompanying drawings, which are provided by way of non-limiting example, explains in what the invention consists and how it can be put into effect.

DETAILED DESCRIPTION OF THE DRAWINGS

Implementations of a method in accordance with the invention of identifying a caller with a telephone service are described below with reference to FIGS. 1 to 3.

They are all based on the capabilities of existing voice recognition systems to recognize a word in a list of N words, where N is of the order of several thousand, and have in common the following steps:
for the telephone service company, drawing up at least one list of literal expressions and allocating to the caller an identifier consisting of a combination of consecutive literal expressions taken from each of said lists,
for the caller, connecting to said telephone service and speaking, in order, each literal expression of said combination, and
for the telephone service company, identifying the caller by searching a database for the identity of the caller allocated the combination of literal expressions spoken by the caller and recognized by the company.

Figure 1:
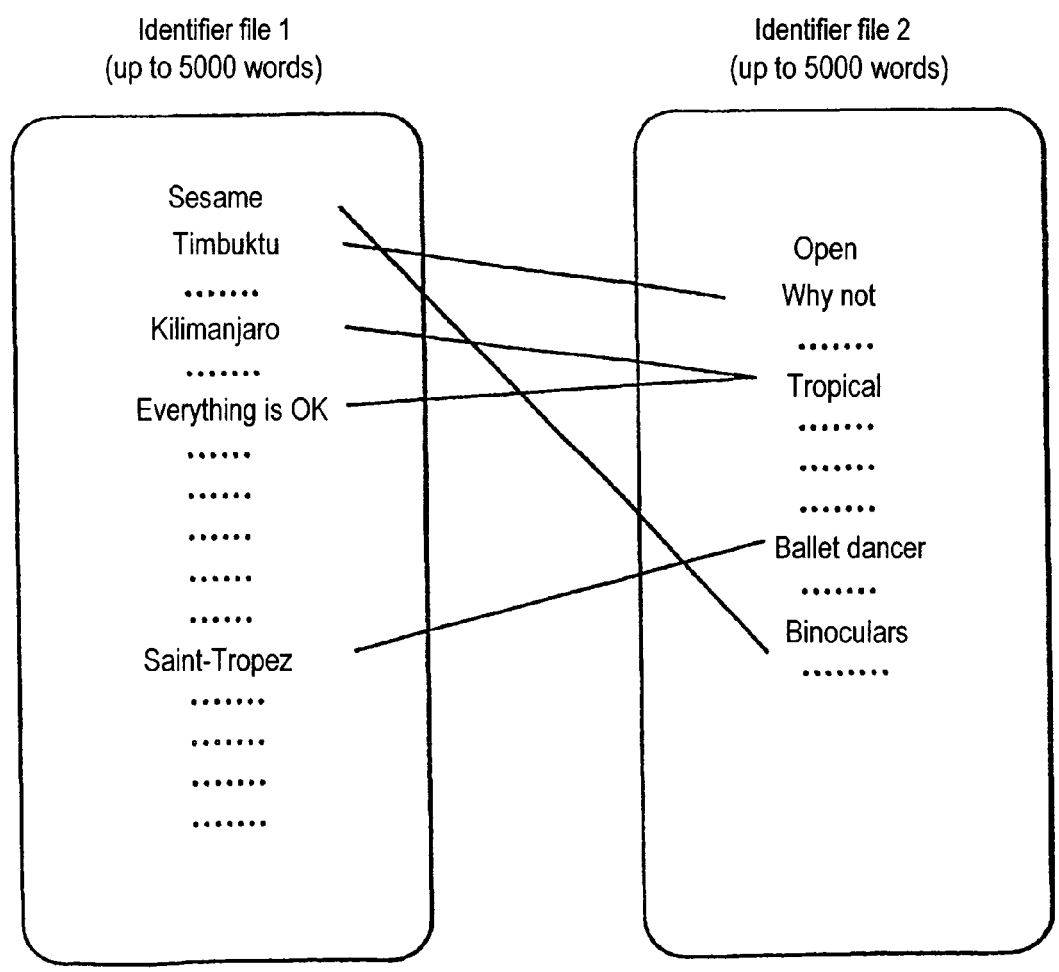
FIG. 1 shows a first method of formulating an identifier conforming to an identification method of the invention using two lists of literal expressions.

The FIG. 1 embodiment corresponds to the use of an identifier resulting from combining two literal expressions or words, ("words" is used herein to represent "literal expressions" for the sake of convenience, although a literal expression can be more than just a word), taken successively from two lists drawn up beforehand, one example of which is shown in FIG. 1.

If each list includes 3000 literal expressions, so that 6000 literal expressions must be defined for the two lists, taking all possible pairs of the literal expressions contained in the two lists produces a total of 9,000,000 identifiers.

The total number of identifiers actually used can greatly exceed the above number, especially if the identifiers are associated with circulating prepaid telephone cards (with each card having a word1/word2 combination when two lists are used, so a card A would be represented as having the combination word1cardA+word2cardA), the number of which can greatly exceed a few tens of millions; in this case, it is all of the possible word1/word2 combinations that form the set of recognized identifiers.

However, in the fight against fraud, this solution has the limitation that all word1/word2 pairs are valid a priori. By purchasing a card A and a card B, a would-be fraudster could obtain two new valid combinations, namely "word 1 card A+word 2 card B" and "word 1 card B+word 2 card A".

To prevent all possibility of fraud, it is advantageous to provide a complementary authentication key with the identifier of the caller. Each word1/word2 combination is then authenticated by an authentication key.

The authentication key can be four digits to be entered in DTMF code, another literal expression recorded by the caller the first time he connects to the telephone service, or a voiceprint that is established during the first few calls on the basis of the spoken combinations of N words constituting the identifier of the caller. For example, as soon as the voiceprint is considered to be sufficiently reliable, voice authentication is activated and substituted for the digits entered in DTMF code. Authentication is then effected by comparing the voiceprint of the sound signal heard during identification with the stored voiceprint.

For improved ergonomics, there can be provision for the caller to deactivate the authentication key.

Figure 2:
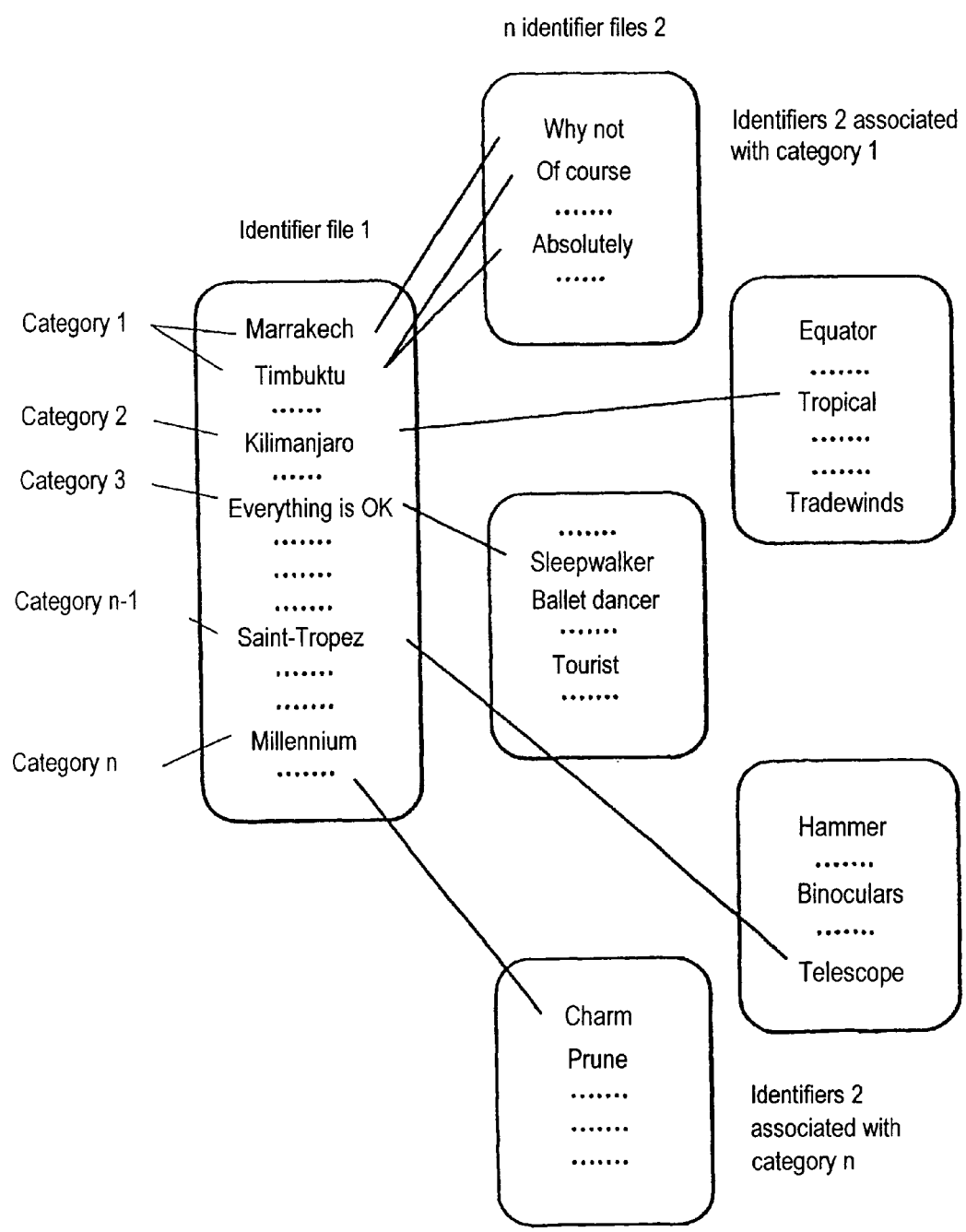
FIG. 2 shows a variant of FIG. 1 in which the second list is divided into categories.

FIG. 2 shows an embodiment using an identifier with only two lists of literal expressions, as in FIG. 1, but in which the security of the method is enhanced by using the category concept. To be more precise, a category n is associated with each literal expression in a first list and each category n is associated with a second list of literal expressions from which the next literal expression is taken.

Thus the number of potential identifiers can be greatly increased and security greatly enhanced without degrading the ergonomics, i.e. still limiting to two the number of literal expressions constituting the identifier.

In the FIG. 2 embodiment, when word 1 in list 1 has been recognized, the category n associated with word 1 is determined. Finally, word 2 is looked for in list 2 associated with category n.

The valid combinations are thus the pairs "word 1 category n list 1+word 2 list 2 associated with category n".

Clearly, unlike the previous situation, if a fraudster were to purchase two prepaid cards A and B, he could not be sure that the combinations "word 1 card A+word 2 card B" and "word 1 card B+word 2 card A" would be valid.

Taking 5000 literal expressions for the first list and five categories of second lists, each of 2000 literal expressions, 10,000,000 combinations are obtained by defining 15,000 expressions for the various lists.

Of course, an authentication key as defined above can be associated with the identifier determined as shown in FIG. 2.

Figure 3:
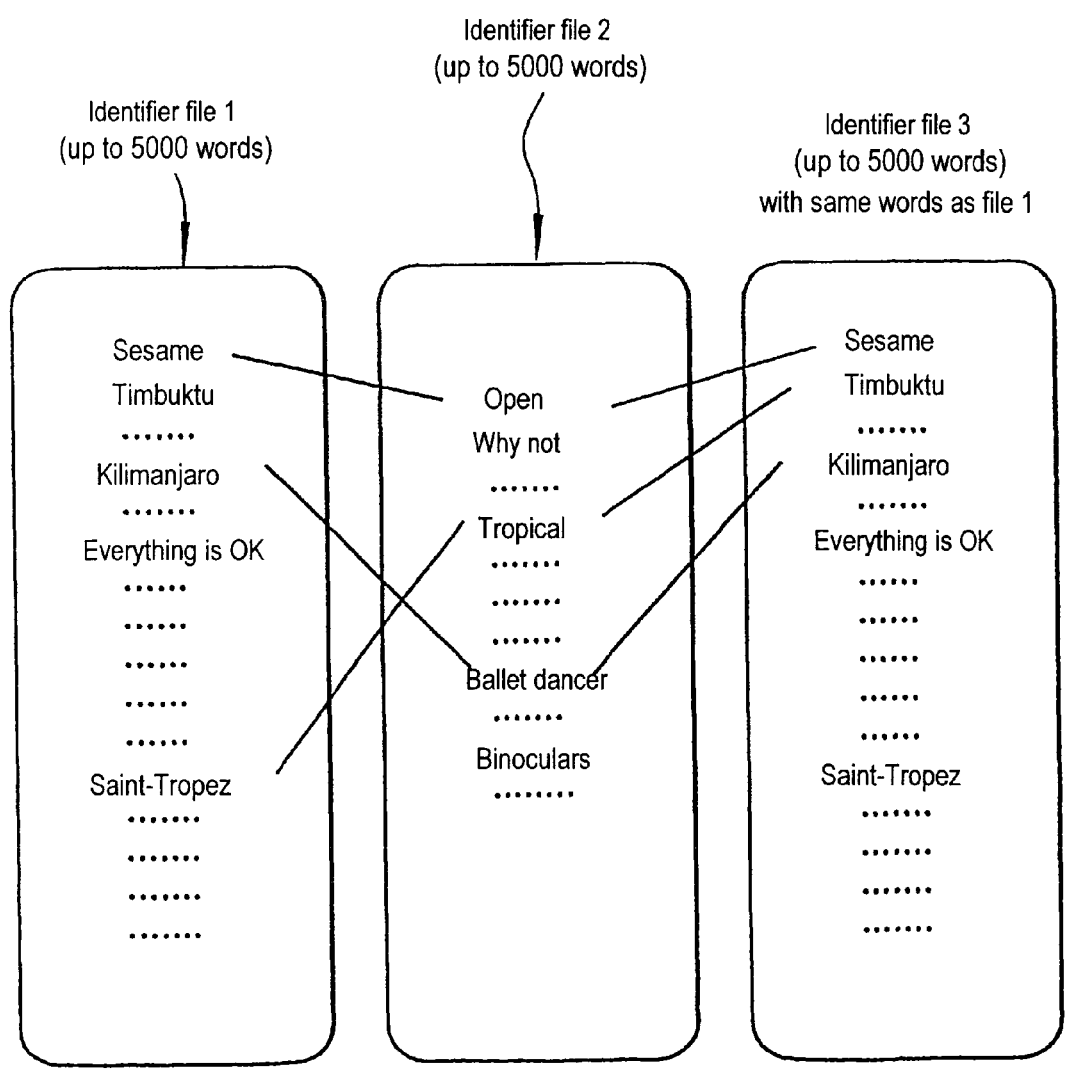
FIG. 3 shows a second method of formulating an identifier conforming to an identification method of the invention using three lists of literal expressions.

FIG. 3 illustrates an embodiment in which a high level of security is obtained by a large number of possible combinations, greater than the number of valid identifiers.

To be more precise, the identifiers that can be allocated to callers consist of a combination of three successive literal expressions each taken from one of three lists of literal expressions drawn up beforehand.

In the case of prepaid cards, by purchasing a card A and a card B a fraudster could potentially obtain six new combinations that might be valid, namely "word 1 card A+word 2 card A+word 3 card B", "word 1 card A+word 2 card B+word 3 card A", etc.

A probability calculation shows that a total of 125,000,000,000 combinations is obtained by defining 5000 literal expressions per list. Also, if the installed base of cards contains 10,000,000 units, it can be deduced that the probability of a person who knows all 5000 words finding a valid combination is one in 12,500 on each attempt.

Since in practice it seems very improbable that a person could know all the literal expressions, the security of the FIG. 3 embodiment is maximized.

Figure 4:
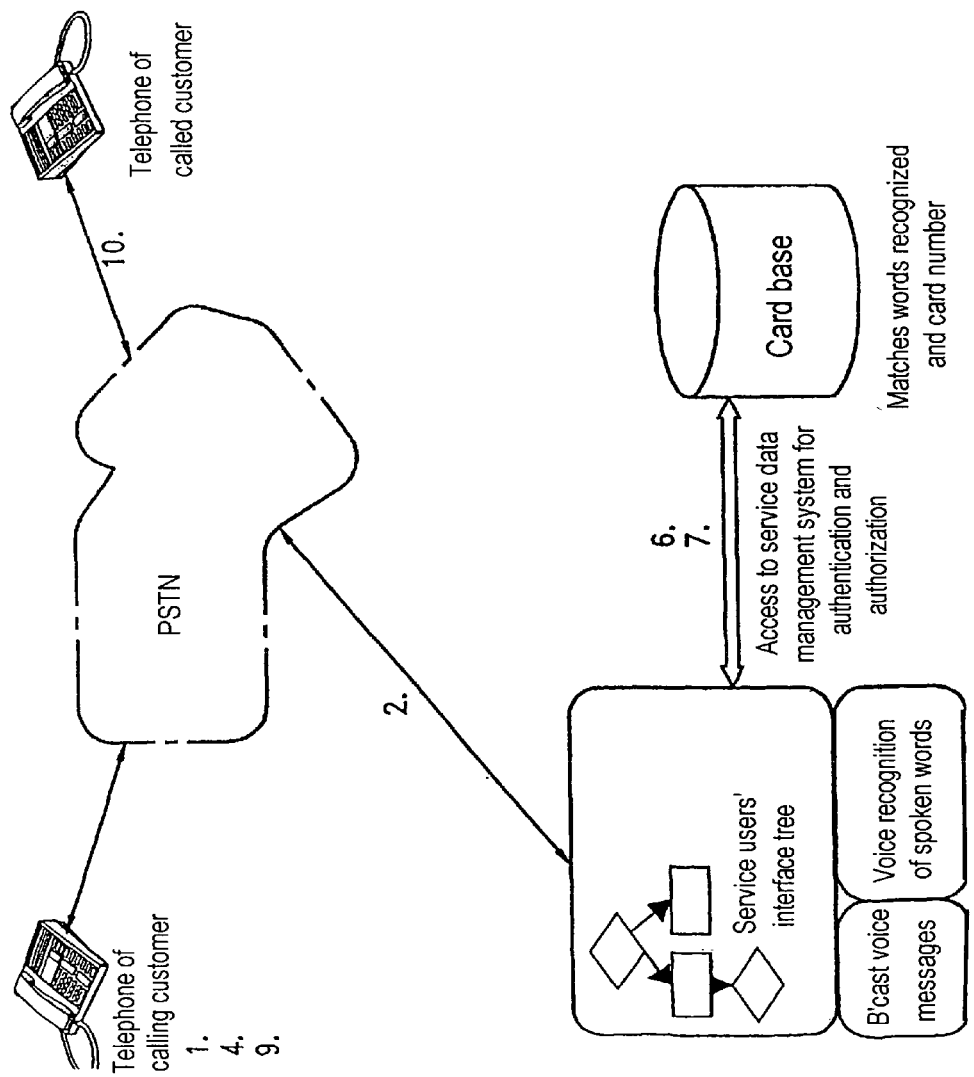
FIG. 4 is a diagram showing an implementation of an identification method of the invention using a prepaid telephone card.

FIG. 4 shows how the identification method of the invention can be implemented when using a prepaid telephone card.

The prepaid card includes, in an area to be scratched off, an identifier consisting of one or more literal expressions to be spoken by a purchaser to identify himself with a telephone service company by an identification method of the invention. By way of redundancy, the card can also include, in another area to be scratched off, a multidigit code to be used if voice recognition is not possible (for example in a noisy environment). Similarly, the card can further include an authentication key.

FIG. 4 shows the following steps:
1. The purchaser of the card enters a service access prefix (for example 30 89).
2. The call is directed to a voice platform (VPF) at the telephone service company with voice recognition functions.
3. The VPF broadcasts a message prompting the caller to speak his identifier.
4. The caller speaks the three (for example) literal expressions of his identifier (Sesame—Open—Pinocchio).
5. The VPF recognizes the literal expressions from the lists of literal expressions drawn up beforehand and determines the card to which the call is to be billed.
6. The VPF interrogates the card base to verify that the identifier recognized matches an existing and active card.
7. The card base sends back an authorization and details of the rights of the card concerned.
8. The VPF broadcasts a message prompting the caller to enter the number of a called party.
9. The caller enters the number of a called party.
10. The call is set up.

What is claimed is:

1. A method of identifying a caller with a telephone service operator, comprising the steps of:

for the operator, deriving at least one list of literal expressions and generating a database of callers authorized to use the telephone service, said database associating each of said authorized callers with a unique identifier consisting of a combination of consecutive literal expressions, each literal expression of the combination being respectively obtained from said at least one list of literal expressions;

for the caller, connecting to said telephone service and speaking, in order, each literal expression of said unique identifier associated therewith and of which said caller has prior knowledge;

for the operator, recognizing whether the literal expressions spoken by the caller belong to said at least one list of literal expressions and, if so, searching the database to compare the spoken combination of consecutive literal expressions to identifiers stored in the database; and identifying the caller if the combination of literal expressions spoken by the caller and recognized by the operator matches an identifier in the database.

2. The method of identifying a caller according to claim 1, wherein an authentication key is associated with said identifier and the caller supplies said authentication key after speaking the combination of consecutive literal expressions associated with the caller.

3. The method of identifying a caller according to claim 2, wherein said authentication key comprises a plurality of digits entered in DTMF code.

4. The method of identifying a caller according to claim 2, wherein said authentication key comprises another literal expression recorded by the caller upon initially connecting to the telephone service.

5. The method of identifying a caller according to claim 2, wherein said authentication key comprises a voiceprint of the caller established when said combination of consecutive literal expressions is spoken.

6. The method of identifying a caller according to claim 1, wherein a double authentication key is associated with said identifier and comprises a main key including a voiceprint of the caller established when said combination of consecutive literal expressions is spoken and a back-up key including a plurality of digits entered in DTMF code.

7. The method of identifying a caller according to claim 1, wherein the list of literal expressions is established by associating a category with each literal expression of a specific list and associating with each category the list of literal expressions from which a next literal expression is obtained.

8. A prepaid telephone card which includes an identifier consisting of one or more literal expressions to be spoken by a caller to identify himself with a telephone service operator by the identification method according to claim 1.

9. The prepaid telephone card according to claim 8, wherein the card also contains an authentication key.

* * * * *